F. J. SCHMIDT.
AUTOMATIC GAS VALVE.
APPLICATION FILED MAR. 6, 1914.
1,126,299.
Patented Jan. 26, 1915.
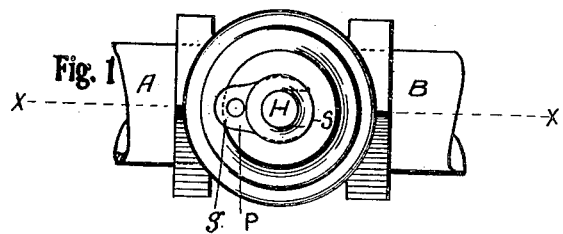
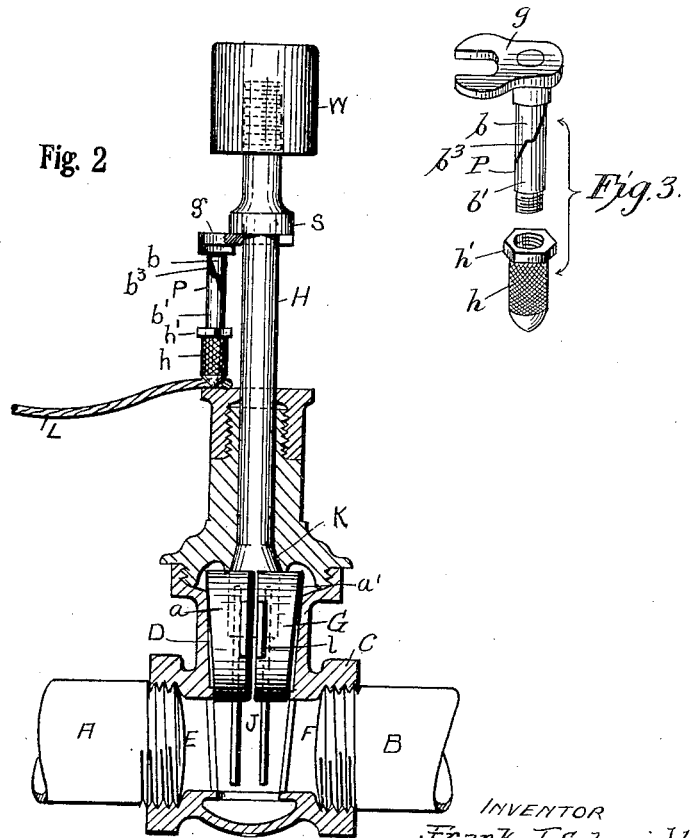

UNITED STATES PATENT OFFICE.

FRANK J. SCHMIDT, OF CLEVELAND, OHIO.

AUTOMATIC GAS-VALVE.

1,126,299.　　　　　Specification of Letters Patent.　　Patented Jan. 26, 1915.

Application filed March 6, 1914.　Serial No. 822,903.

*To all whom it may concern:*

Be it known that I, FRANK J. SCHMIDT, a citizen of the United States, residing at Cleveland, in the county of Cuyahoga and State of Ohio, have invented certain new and useful Improvements in Automatic Gas-Valves, of which the following is a specification.

My invention relates to improvements in automatic safety valves for gas supply pipes and the object is to provide a valve which shall automatically shut off the supply of gas in case of fire in the building in which said valve is located, and furthermore to provide a valve which can be operated easily at will.

This invention consists in the combination and arrangement of parts set forth in the following specification and particularly pointed out in the appended claims.

Referring to the drawings Figure (1) is a plan view of my invention with weight removed and Fig. (2) is a sectional view on line X—X Fig. (1) and Fig. (3) is a detail view of my valve supporting member.

In the drawings illustrating my invention I show a pipe A leading into a building from a gas main, pipe B leading to a gas meter and a valve casing C connecting the ends of said pipes A and B said valve casing having a tapered valve chamber D which extends transversely across the main passage through the valve casing, and is provided in its lower part with opposite lateral ports E and F. Within said valve chamber is located a gate valve G consisting of two wedge-shaped disks $a$ and $a'$ and suitably mounted on valve stem H and having flanges $l$ which slide in the grooves J which are located on opposite sides of the valve chamber D. There is also located in said valve chamber D a tapered head K which forms a part of the valve stem H and which serves as a closure to prevent the escape of gas around the valve stem H thus doing away with needless packing which is usually used in such cases and which is liable to corrode and prevent the valve D from operating. When the valve G is in a raised position it stands above said ports and permits the free passage of gas through the casing, said valve being held in this position by means of a collapsible supporting member P as shown in Fig. (3) comprising two bevel stem portions $b$ and $b'$ which are soldered together at the bevel engaging faces $b^3$ by a fusible metal. The upper stem portion $b$ has a collar with lips $g$ embracing the valve stem and the lower stem portion $b'$ is threaded and provided with a pointed screw tip $h$ and lock nut $h'$. The pointed tip $h$ being of a suitable metal so that it may set into the metal of the cap $p$ at one side of the valve stem H and the yoke $g$ is placed beneath the collar $s$ on the valve stem, thereby holding the valve and maintaining an open passage in the pipe line.

It sometimes occurs that a fire starts in the part of a building where it takes some time for the heat to get to this valve and for such occasions I have provided a cable L having a loop at one end which is placed around the supporting member $p$ and which leads to a point outside the building enabling me to displace said supporting member whereby the valve G will drop into place and shut off the flow of gas from the main. When the heat from a fire reaches the valve it melts the fusible metal in said supporting member parting the members $b$ and $b'$ at their beveled faces $b^3$ and the valve G drops to a closed position under a weight W.

What I claim.

In automatic safety valves, a valve adapted to be seated by gravity, a two part member having beveled faces and a fusible soldered connection and an adjustable end, the said valve having a collar, and lips embracing said valve beneath said collar and mounted on said two part member serving as a support for the said valve.

In testimony whereof I affix my signature in presence of two witnesses.

FRANK J. SCHMIDT.

Witnesses:
　E. M. FISHER,
　M. A. WONDRICH.

Copies of this patent may be obtained for five cents each, by addressing the "Commissioner of Patents, Washington, D. C."